(No Model.) 2 Sheets—Sheet 1.

W. F. CONWAY.
POTATO DIGGER AND PICKER.

No. 386,384. Patented July 17, 1888.

Attest:
Geo. H. Britt.
W. E. Bowen.

Inventor:
William F. Conway.
By J. Ell Bowen,
Atty.

(No Model.) 2 Sheets—Sheet 2.

W. F. CONWAY.
POTATO DIGGER AND PICKER.

No. 386,384. Patented July 17, 1888.

Attest:
Geo. H. Botts.
W. E. Bowen.

Inventor:
William F. Conway.
By J. E. M. Bowen,
Atty.

UNITED STATES PATENT OFFICE.

WILLIAM F. CONWAY, OF SHEFFIELD, MASSACHUSETTS.

POTATO DIGGER AND PICKER.

SPECIFICATION forming part of Letters Patent No. 386,384, dated July 17, 1888.

Application filed June 20, 1887. Serial No. 241,842. (No model.)

*To all whom it may concern:*

Be it known that I, WILLIAM F. CONWAY, a citizen of the United States, and a resident of Sheffield, in the county of Berkshire and State of Massachusetts, have invented certain new and useful Improvements in Potato Diggers and Pickers, of which the following is a specification.

This invention relates to machines for digging and picking potatoes—that is, organizations of mechanism adapted to be drawn by horses, whereby potatoes are dug from the ground and automatically separated from the soil and vines with which they are mingled.

The object of my invention is to devise a machine embodying a forwardly-projecting plow or shovel capable of being raised or lowered from the driver's seat, an endless traveling apron or platform to receive the potatoes, &c., and automatically carry the same rearward, and a shaker or vibrating receptacle adapted to receive the potatoes, &c., from said platform and separate them from the soil and vines before they are delivered into the bag or the like arranged at the back end of the machine to receive them.

The organization by which I accomplish the above-stated objects is simple and compact, and it embodies peculiarities of construction which render the same effective and reliable in operation.

The features of novelty for which Letters Patent are desired are specified in the claims at the end of this specification.

Figure 1:
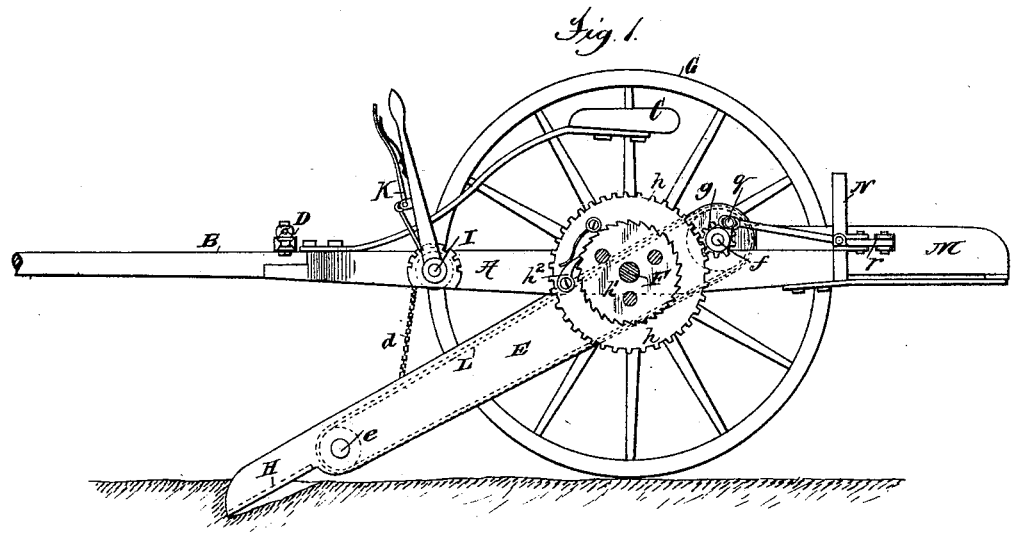
Figure 2:
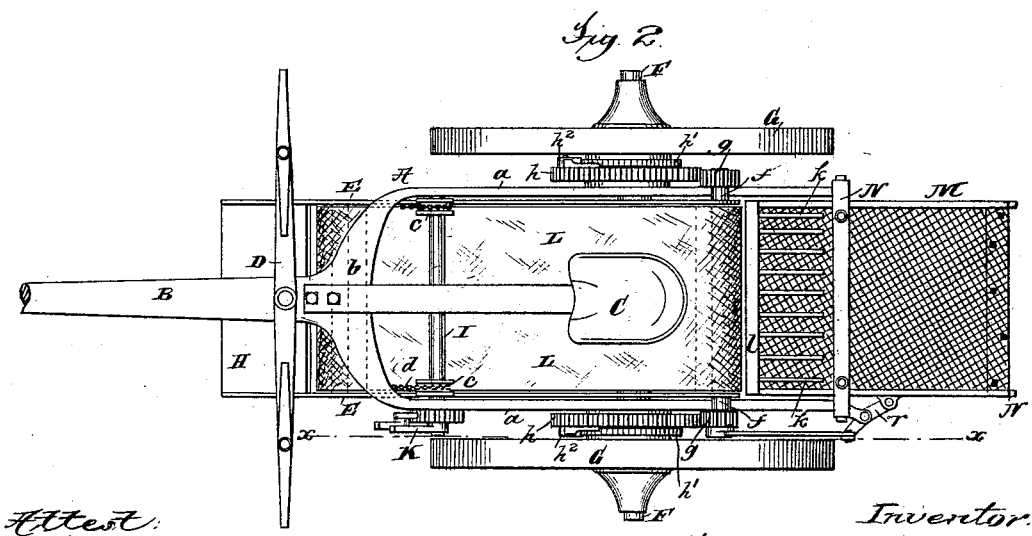
Figure 3:
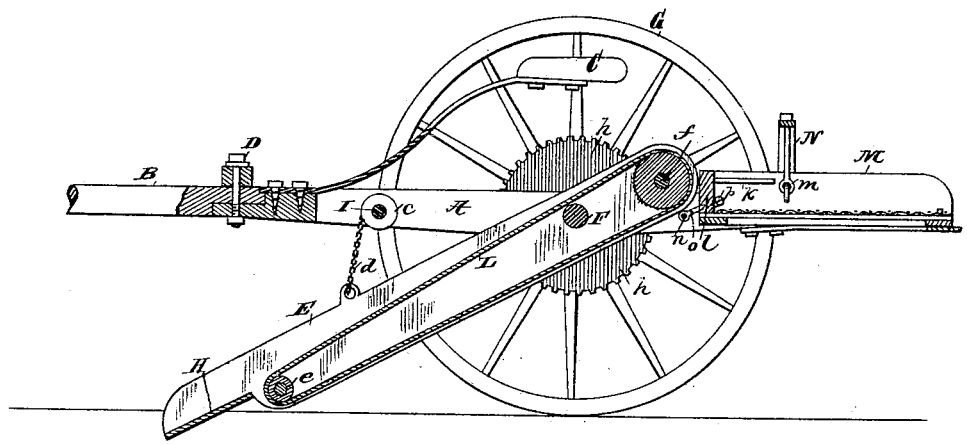
Figure 4:
Figure 5:

In the accompanying drawings, which form a part of this specification, and in which like features are indicated by like letters of reference in the several views, Figure 1 is a longitudinal sectional view through the line *x x* of Fig. 2 of a machine embodying my improvements. Fig. 2 is a top plan view of said machine. Fig. 3 is a central longitudinal section of Fig. 2. Fig. 4 is a detached plan view of the upper shaft of the traveling platform; and Fig. 5 is a like view of the main axle of the machine, which carries the driving-wheels, as well as the cog-wheels forming part of the gearing, by which motion is imparted to the traveling platform and shaker.

Referring to the drawings, the letter A indicates the main frame of the machine, which is of the form indicated in Fig. 2, comprising the side bars, *a a*, joined at the front at *b* and open at the rear. This frame may be of cast-iron, and is adapted to receive the tongue B and furnish a support for the driver's seat C. The singletree D, to which the horses are attached, will be secured to the tongue B in the usual manner.

The letter E indicates a metallic frame located between the side bars, *a a*, of frame A, and supported on the axle F, to which the driving-wheels G G are attached. The axle F passes laterally through the side bars, *a a*, and laterally through the rear end of frame E, thus supporting both frames A and E and permitting them to rise and fall, as upon a pivot. The rear end of frame E, it will be seen, is thus held elevated above the top surface of the side bars, *a a*, while its front end projects forward of the machine beneath the lower surface of said bars. At the front end of frame E it is provided with a shovel-like blade, H, preferably of steel. At the front of frame A, between the side bars, *a a*, I arrange a shaft, I, provided with grooved enlargements *c*, to which are attached chains or cords *d*, which have their opposite ends fastened to and near the front of the frame E. The purpose of this shaft and its attachments is to permit the elevation of the front end of frame E, and consequently the lifting of the shovel H out of the ground by the driver when seated upon the machine, which it may be desirable to do in order to avoid obstructions in the soil and when the machine is being driven to and from the field. This raising and lowering of the front of frame E is accomplished by the driver from his seat through the instrumentality of the clutch device K, which is of the usual construction, and is affixed to one end of the shaft I, where the latter protrudes through the side of the frame A. The operation of this clutch K is well understood and need not be explained in this connection, it being of course seen that in changing the position of the handle the shaft I is rotated, thus winding up the cords *d* and raising the front end of frame E away from contact with the ground, and by releasing the clutch it will automatically lock the handle and thus secure the frame E in position.

The frame E is provided immediately back of the shovel H with a transverse roller, e, of usual construction, and at the opposite or rear end of said frame E there is located the shaft f. This shaft f passes transversely through the sides of said frame E, protruding beyond the frame at each side, and is provided upon its protruding ends with pinions g, adapted to mesh with the cog-wheels h, which are located upon driving-shaft F, for the purpose presently explained. As shown in Fig. 4, the shaft f is provided with flanged spools i, whose surfaces are roughened. These spools, when the shaft is in its place, occupy positions adjacent to the inner surfaces of the sides of the frame E, the flanges of the spools abutting against the frame. The purpose of this construction is to furnish a proper support for the traveling apron or platform, to prevent it from slipping while in operation and to avoid frictional contact between said platform and the sides of its supporting frame. The traveling platform is indicated by L, and it may be composed of any material possessing the requisite qualities of flexibility and durability.

As before stated, the axle F, which carries the driving-wheels, passes laterally through the frames A and E and supports said frames. Loosely mounted upon said axle F, between the driving-wheels G and the frame A, are the cog-wheels h, before referred to, which mesh with the pinion g, whereby motion is communicated to the shaft f, thus causing the platform L to continuously travel when the machine is drawn forward. In order to enable the forward movement of the driving-wheels to be communicated through the gearing g h to the traveling platform, the inner surfaces of the hubs of wheels G are provided with ratchet-teeth h', preferably integral therewith, while the outer surfaces of the cog-wheels h are provided with spring-pressed pawls h², which cooperate with the said ratchet-teeth to lock the cog-wheels h to the driving-wheels G, and thereby cause the former to revolve with the latter, and thus communicate the desired movement through the pinions g to the shaft f to the platform L.

Supported at the rear of frame A is the vibrating shaker and picker M, the front end of which is in close proximity to the rear end of the frame of the traveling platform, so that the potatoes, &c., will be conveyed onto the same. The shaker M consists of a wooden frame, open at its rear, and provided on its bottom with a suitable screen. It is also provided with a series of metallic teeth or bars, k, protruding horizontally from the front wall, l, of the shaker, and projecting over the screen for about one-third of its length. This shaker and picker is suspended from the open frame N by means of links m, and is connected to a cross-bar, n, by a loop, o, secured to its front wall by a staple, p. The frame N is secured to the extreme ends of the side bars, a, and projects beneath the suspended shaker, thus serving as a support for the weight that may be imposed upon the shaker, and also as a means for securing the bag or the like into which the screened potatoes are intended to be dropped.

Vibratory motion is imparted to the loosely-suspended shaker and picker M by means of the crank q, affixed to the end of the shaft f, and the bell-crank lever r, jointed to a lug on the frame N, and the necessary connecting-rods. The manner in which the devices last described operate to vibrate the shaker M is of course obvious without further description, as the crank q must of necessity revolve with the revolution of the gearing g h.

The operation of this machine will be understood from the foregoing description.

The machine is intended to be drawn by two horses, which walk in the furrows between the hills of potatoes, and, as explained, the forward movement of the machine causes the traveling platform to move continuously from front to rear, carrying with it the potatoes, &c., that are loosened by the shovel H, and delivering the same onto the shaker and picker, which operate to separate the soil and vines from the potatoes and deliver the latter into the receptacle provided therefor. The backward movement of the machine will not communicate motion to the traveling platform, as the pawl is then lifted out of the ratchet-teeth in the usual manner.

Having thus described my invention, what I claim as new, and desire to secure by Letters Patent, is—

1. A single pair of driving-wheels, the frames A and E, supported solely upon the axle of said driving-wheels in such manner as to vibrate thereon independently of each other, the frame A, having transverse shaft I, and the frame E, having a shovel at its front end, in combination with clutch and chains K d, substantially as set forth.

2. The frames A E, suspended solely upon the driving-axle F, so as to vibrate thereupon independently of each other, combined with the endless platform, shafts e f, the latter arranged in the rear of the driving-axle F and projecting at each end beyond the sides of frame E, and pinions g, cog-wheels h, and a pawl-and-ratchet mechanism, substantially as set forth.

3. The driving-axle F, wheels G, the inner surfaces of whose hubs are provided with ratchet-teeth, and the cog-wheels h, mounted on said driving-axle and provided upon their outer surfaces with spring-pressed pawls, in combination with the pinions g, shaft f, traveling platform, and frame E, substantially as set forth.

4. The frames A E and traveling platform L, in combination with the frame N, secured to the rear ends of the side bars of frame A, and the vibrating shaker supported by said frame N, substantially as set forth.

5. The frames A E, traveling platform L, and shaft f, in combination with gearing g h, shaker and supporting-frame M N, crank $q$, and bell-crank lever and connecting-rod, substantially as set forth.

6. In combination, in a potato digger and picker, a shovel, a revolving platform, and a vibratory shaker provided with horizontally-projecting teeth or bars $k$, substantially as set forth.

Signed at Great Barrington, in the county of Berkshire and State of Massachusetts, this 25th day of May, A. D. 1887.

WILLIAM F. CONWAY.

Witnesses:
EMMA A. J. LANGDON,
NORMAN W. SHORES.